(12) United States Patent
Ziebarth et al.

(10) Patent No.: US 8,092,579 B2
(45) Date of Patent: Jan. 10, 2012

(54) THERMAL SHOCK RESISTANT SOOT FILTER

(75) Inventors: Robin Ziebarth, Midland, MI (US); Robert T. Nilsson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 283 days.

(21) Appl. No.: 12/248,107

(22) Filed: Oct. 9, 2008

(65) Prior Publication Data

US 2009/0095158 A1  Apr. 16, 2009

Related U.S. Application Data

(60) Provisional application No. 60/979,551, filed on Oct. 12, 2007.

(51) Int. Cl.
*B01D 46/00* (2006.01)
(52) U.S. Cl. ...... 95/278; 55/282.3; 55/523; 55/DIG. 10; 55/DIG. 30
(58) Field of Classification Search ............ 95/278; 422/169–172, 177–182; 55/522–524
See application file for complete search history.

(56) References Cited

U.S. PATENT DOCUMENTS

| | | | |
|---|---|---|---|
| 2,340,071 A * | 1/1944 | Maher | 48/192 |
| 3,251,403 A | 5/1966 | Smith | |
| 3,565,830 A | 2/1971 | Keith et al. | |
| 3,641,763 A * | 2/1972 | Cole | 60/39.512 |
| 3,887,741 A | 6/1975 | Dwyer | |
| 3,983,283 A | 9/1976 | Bagley | |
| 4,169,911 A * | 10/1979 | Yoshida et al. | 428/35.8 |
| 4,304,585 A | 12/1981 | Oda et al. | |
| 4,316,822 A | 2/1982 | Fujitani et al. | |
| 4,329,162 A | 5/1982 | Pitcher | |
| 4,335,783 A | 6/1982 | McBrayer et al. | |
| 4,381,815 A | 5/1983 | Frost et al. | |
| 4,515,758 A | 5/1985 | Domesle et al. | |
| 4,581,285 A * | 4/1986 | Mahefkey, Jr. | 442/378 |
| 4,598,054 A | 7/1986 | Mochida et al. | |
| 4,619,244 A * | 10/1986 | Marks | 126/680 |
| 4,669,261 A | 6/1987 | Woerner et al. | |
| 4,702,853 A * | 10/1987 | Benson et al. | 252/70 |
| 4,727,052 A | 2/1988 | Wan et al. | |
| 4,740,360 A | 4/1988 | Geus et al. | |
| 4,810,554 A | 3/1989 | Hattori et al. | |
| 4,828,807 A | 5/1989 | Domesle et al. | |
| 4,902,664 A | 2/1990 | Wan | |
| 4,953,627 A | 9/1990 | Ito et al. | |

(Continued)

FOREIGN PATENT DOCUMENTS

EP   1142619 B1   4/2001

(Continued)

OTHER PUBLICATIONS

Electrocomponent Sci. and Tech., 1975, vol. 2, pp. 163-199 by Freiser, R.G., Tables IX, XIV and XVI, "A Review of solder Glasses".

*Primary Examiner* — Duane Smith
*Assistant Examiner* — Amber Orlando

(57) ABSTRACT

A ceramic honeycomb filter having improved thermal shock resistance is comprised of a ceramic honeycomb filter that has a heat absorbing material that undergoes a reversible phase change that absorbs at least in part the heat energy, for example, arising from the combustion of Diesel soot entrapped in the filter.

20 Claims, 2 Drawing Sheets

U.S. PATENT DOCUMENTS

| | | | |
|---|---|---|---|
| 5,013,705 A | 5/1991 | Koberstein et al. | |
| 5,022,991 A * | 6/1991 | Day et al. | 210/506 |
| 5,063,192 A | 11/1991 | Murakami et al. | |
| 5,098,455 A | 3/1992 | Doty et al. | |
| 5,130,109 A | 7/1992 | Wan | |
| 5,173,349 A | 12/1992 | Yavuz et al. | |
| 5,194,154 A | 3/1993 | Moyer et al. | |
| 5,198,007 A | 3/1993 | Moyer et al. | |
| 5,254,519 A | 10/1993 | Wan et al. | |
| 5,340,516 A | 8/1994 | Yavuz et al. | |
| 5,364,259 A * | 11/1994 | Matros et al. | 431/5 |
| 5,491,120 A | 2/1996 | Voss et al. | |
| 5,750,026 A * | 5/1998 | Gadkaree et al. | 210/502.1 |
| 5,759,496 A * | 6/1998 | Hickman et al. | 422/171 |
| 5,787,707 A * | 8/1998 | Hertl et al. | 60/297 |
| 5,914,187 A | 6/1999 | Naruse et al. | |
| 5,939,354 A | 8/1999 | Golden | |
| 5,993,762 A | 11/1999 | Rajaram et al. | |
| 6,152,978 A * | 11/2000 | Lundquist | 55/385.1 |
| 6,255,249 B1 | 7/2001 | Voss et al. | |
| 6,306,335 B1 | 10/2001 | Wallin et al. | |
| 6,508,852 B1 | 1/2003 | Hickman et al. | |
| 6,541,407 B2 | 4/2003 | Beall et al. | |
| 6,582,796 B1 | 6/2003 | Joulin et al. | |
| 6,596,665 B2 | 7/2003 | Wallin et al. | |
| 6,669,751 B1 | 12/2003 | Ohno et al. | |
| 6,797,666 B2 | 9/2004 | Harada et al. | |
| 6,875,407 B1 * | 4/2005 | Biel et al. | 422/179 |
| 6,902,599 B2 | 6/2005 | Bardon | |
| 7,052,760 B2 | 5/2006 | Hijikata | |
| 7,087,286 B2 | 8/2006 | Hijikata | |
| 7,621,981 B2 * | 11/2009 | Blackwell et al. | 95/273 |
| 7,754,935 B2 * | 7/2010 | Brophy et al. | 585/659 |
| 2001/0038810 A1 | 11/2001 | Wallin et al. | |
| 2002/0044897 A1 | 4/2002 | Kakwani et al. | |
| 2002/0081243 A1 * | 6/2002 | He | 422/177 |
| 2002/0197191 A1 | 12/2002 | Takeshima et al. | |
| 2003/0031608 A1 * | 2/2003 | Carroni et al. | 422/180 |
| 2003/0124037 A1 | 7/2003 | Voss et al. | |
| 2004/0020359 A1 | 2/2004 | Koermer et al. | |
| 2004/0093861 A1 * | 5/2004 | Watanabe et al. | 60/300 |
| 2004/0211182 A1 * | 10/2004 | Gould | 60/643 |
| 2005/0113249 A1 | 5/2005 | Ziebarth et al. | |
| 2005/0235622 A1 | 10/2005 | Cutler et al. | |
| 2006/0048501 A1 * | 3/2006 | Rasmussen | 60/286 |
| 2006/0051556 A1 | 3/2006 | Ohno et al. | |
| 2006/0191248 A1 | 8/2006 | Bardhan et al. | |
| 2006/0225390 A1 * | 10/2006 | Yoshida | 55/523 |
| 2007/0028604 A1 | 2/2007 | Twigg et al. | |
| 2007/0028767 A1 * | 2/2007 | Choi et al. | 95/59 |
| 2007/0033912 A1 * | 2/2007 | Furukawa et al. | 55/523 |
| 2007/0105707 A1 | 5/2007 | Ichikawa | |
| 2007/0218249 A1 | 9/2007 | Kai | |
| 2007/0274881 A1 * | 11/2007 | Rasmussen | 422/198 |
| 2008/0044621 A1 * | 2/2008 | Strauss | 428/108 |
| 2008/0155950 A1 * | 7/2008 | Blackwell et al. | 55/522 |

FOREIGN PATENT DOCUMENTS

| | | |
|---|---|---|
| GB | 1014498 | 12/1965 |
| GB | 1119180 | 7/1968 |
| WO | WO97/00119 | 1/1997 |
| WO | WO99/12642 | 3/1999 |
| WO | WO00/62923 | 10/2000 |
| WO | WO01/02083 A1 | 1/2001 |
| WO | WO03/011437 A1 | 2/2003 |
| WO | WO03/051488 A1 | 6/2003 |
| WO | WO03/082773 A1 | 10/2003 |
| WO | WO2004/011124 A1 | 2/2004 |
| WO | WO2004/011386 A1 | 2/2004 |
| WO | WO2005/097706 A2 | 10/2005 |

* cited by examiner

THERMAL SHOCK RESISTANT SOOT FILTER

CROSS-REFERENCE TO RELATED APPLICATION

This application claims the benefit of U.S. Provisional Application Ser. No. 60/979,551, filed Oct. 12, 2007, which is hereby incorporated by reference.

FIELD OF THE INVENTION

The present invention relates to an improved ceramic honeycomb particulate filter. In particular, the invention relates to honeycomb ceramic filters that have improved thermal shock resistance.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. The filters have had many configurations as exemplified by GB 1,014,498 and U.S. Pat. No. 4,828,807. The most common and useful filters have tended to be porous ceramic honeycombs that have plugged channels such that the exhaust gas must enter a channel and pass through the wall of the channel as exemplified by U.S. Pat. No. 4,329,162.

Early attempts to make more thermal shock resistant honeycombs, for example, for use in heat regenerators and catalytic converters focused on the use of ceramics having a low coefficient of thermal expansion, such as described in U.S. Pat. Nos. 4,304,585 and 4,598,054. Nevertheless the art is replete with methods of improving the shock resistance of ceramic honeycombs, for example by assembling smaller honeycombs with layers between the smaller honeycombs (i.e., segmented honeycombs). The layers are well known and have included all manner of ceramic cements, foamed or unfoamed, with differing additives such as ceramic or metal fibers, organic materials such as pore formers and binders. Exemplary patents include those previously mentioned and, for example, U.S. Pat. Nos. 3,251,403; 4,335,783; 4,381,815; 4,810,554; 4,953,627; 5,914,187 and 7,087,286. Unfortunately, all of these result in significantly greater forming complexity and increase in pressure drop, for example, when the honeycomb is used as a filter with inlet and outlet channels.

Another method for increasing the thermal shock resistance of ceramic honeycombs include, for example, creating slits radially or axially in the honeycombs to make the honeycombs more compliant due to hoop and axial stresses, such as in U.S. Pat. Nos. 3,887,741 and 3,983,283. This method to increase the thermal shock resistance, unfortunately, tends to result in fragile honeycombs resulting in more handling damage during the manufacture and to complexity in forming the radial grooves.

What is needed is a Diesel particulate filter that avoids one or more problems of the prior art such as one of the aforementioned problems. In particular, it would be desirable to provide a Diesel particulate filter that maximizes the effective filtration area while smoothing out temperature differences within the catalyst due to combustion of differing species along the length of the filter (i.e., more thermal shock resistant). It would also be desirable when doing so to minimize the pressure drop increase associated with other methods used to improve thermal shock of the honeycombs.

SUMMARY OF THE INVENTION

We have discovered an improved ceramic honeycomb structure that allows, for example, soot filters that maximize the effective filtration area (i.e., minimizes pressure drop) while providing excellent thermal shock resistance.

A first aspect of this invention is a ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body comprises a heat absorbing material that undergoes a reversible phase change that absorbs heat energy. In a particular embodiment, the heat absorbing material is selected such that the phase change absorbs energy at a temperature that minimizes the temperature rise due to combustion of Diesel soot in the ceramic honeycomb filter.

Another aspect of the invention is a method of filtering Diesel soot comprising, i) providing a ceramic honeycomb filter having heat absorbing material that undergoes a phase change that absorbs heat energy, ii) passing, Diesel exhaust through the said ceramic honeycomb filter such that soot in said exhaust is captured by said filter, and iii) heating the ceramic honeycomb filter sufficiently such that the Diesel soot combusts wherein the heat absorbing material undergoes a phase change absorbing a portion of the heat generated from combustion of said soot.

The filter may be used in any applications in which particulates such as soot need to be removed from a gaseous or liquid stream such as an automobile, train, truck or stationary power plant exhaust. The filter is particularly useful to remove soot from Diesel engine exhausts. In addition, the phase change materials may be incorporated into ceramic honeycomb supports for heterogeneous catalysis reactions (e.g., partial oxidation reactions) in which, for example, only the channels with the phase change material would be plugged and the other channels remaining open for the reactants and products to pass through the channels.

DETAILED DESCRIPTION OF THE INVENTION

Figure 1:
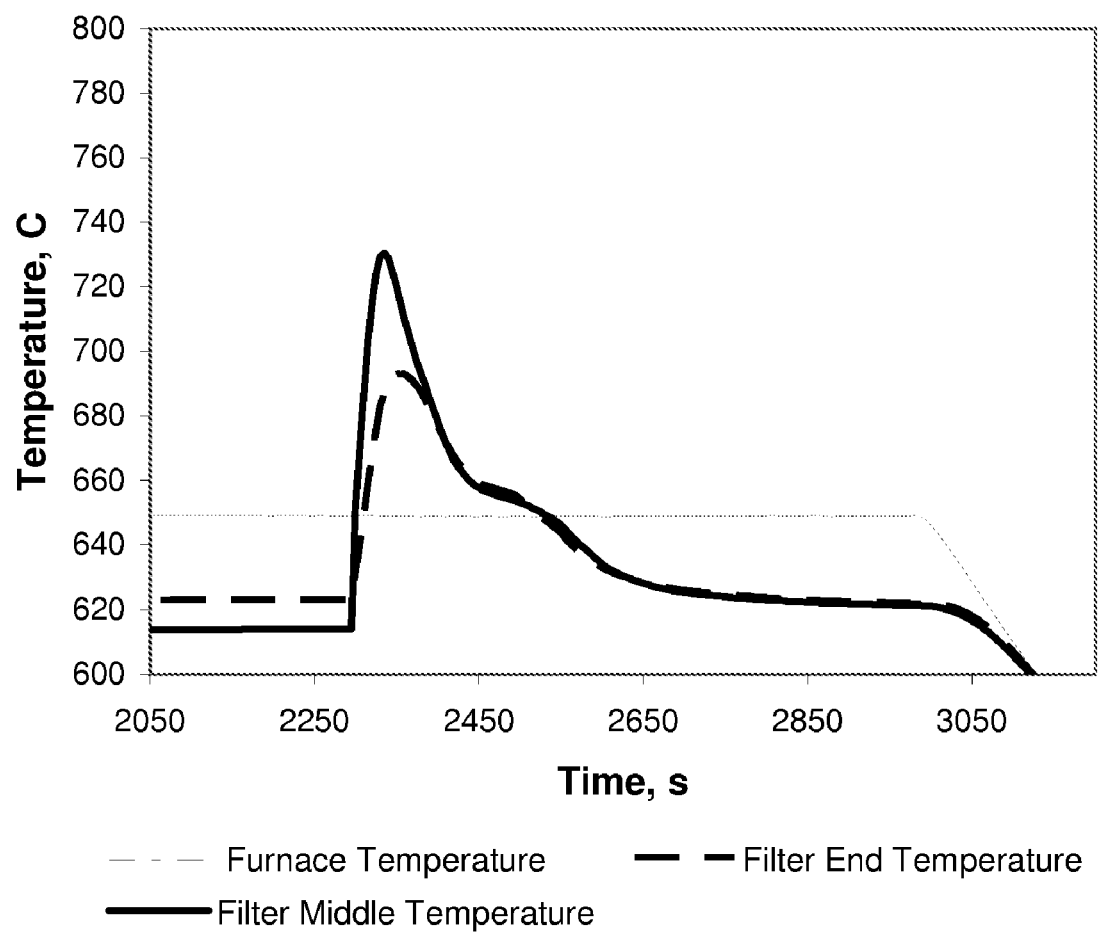
FIG. 1 is a graph of the temperature rise during the burn off of soot deposited on a filter having a phase change material of this invention.

Heat absorbing material that undergoes a phase change means a material that undergoes a phase change above room temperature and within the operating temperature of the filter (i.e., temperature below where the filter melts or decomposes) that reversibly absorbs heat such as melting from a solid to a liquid, changing crystalline structure or in the case of amorphous materials goes through a glass transition temperature or melting range. Generally, the phase change occurs at a temperature, for example, close to the temperature or temperature range where soot that is trapped in the filter combusts. The temperature is desirably above the temperature where the soot starts to combust. The temperature where the soot starts to combust may depend, for example, on the type of soot, application, or presence of catalysts in the filter.

Generally, the temperature where the phase change occurs is at least about 400° C. to about 1200° C. Suitable ranges of course may be narrower, for example, the temperature may be at least about, 425° C., 450° C., 500° C., 525° C., 550° C., 575° C., 600° C., or 625° C. to at most about 1100° C., 1000° C., 900° C., 850° C., 800° C., 775° C., 750° C., 725° C. or 700° C. It is understood that the phase change may occur over at temperature range, but for the purposes herein, the temperature of the phase change is at the peak of the endotherm upon heating using well known standard thermal analysis techniques such as differential thermal analysis (DTA) or differential scanning calorimetry (DSC).

In one embodiment, the heat absorbing material is a metal that has a shell comprised of a metal having a higher melting temperature, or ceramic with a higher melting temperature such as an oxide of the heat absorbing material when it is a metal. In such an embodiment, it is preferred that when the metal undergoes a phase change, the metal is contained within the shell and does not flow within the filter. Likewise, a shell may be used to contain, for example, an inorganic glass that may go through both a glass transition and melting range. In the case of an inorganic glass, the ceramic shell may be any suitable to contain the glass or in some instances may be a metal with a higher melting temperature. Generally, the shell has melting temperature that is substantially greater than the heat absorbing materials phase change temperature (e.g., melting temperature). The shell, for example, typically has a melting temperature that is at least about 200° C. to greater than or equal to the melting or decomposition temperature of the ceramic honeycomb filter itself.

The shell, when employed, may be formed by any suitable method. For example, the shell may simply be container in which the heat absorbing material is placed and the container subsequently sealed. Subsequently sealing may be accomplished, for example, in the case of a metal, by brazing or welding a top onto the container. In the case of ceramic container, the container may be sealed by placing a top on heating sufficiently to create a ceramic or metallic bond. The metallic bond may be further reacted to form a ceramic bond where the reaction could be with a surrounding gas of the ceramic of the shell.

In another embodiment, the ceramic shell may be formed by reacting the heat absorbing material, when, for example, it is a metal with a gas or other reactant (e.g., carbon) to form a metal-ceramic layer on the metal heat absorbing material. Generally, the temperature to form such a layer, which for convenience typically is an oxide, is great enough to easily react the surface of the metal, but not so great that the metal melts and flows prior to forming a sufficient ceramic layer necessary to impede the flow of the metal. Generally, this temperature is below the melting temperature of the metal to about 50% of the melting temperature in degrees Kelvin. For the sake of speed but with suitable control, the temperature may be 60%, 70%, 80% or 90% of the melting temperature of the metal. Suitable ceramics include, for example, nitrides, oxides, carbides, borides or combinations thereof (e.g., oxynitrides). As described above, an oxide or oxy-combination as described above for both stability and convenience (i.e., air may be used to form the oxide layer), are preferred. Most preferably the shell ceramic is an oxide.

Examples of suitable metals include, aluminum, iron, tin, zinc, copper, nickel, alloys of each of the aforementioned or mixtures thereof. When the filter is used to capture Diesel soot, aluminum, aluminum alloy or mixtures thereof may be useful and in particular with an oxide layer that is able to contain the metal upon melting. Said oxide layer may be any suitable thickness to contain the metal, but typically is at least about 5 nm (nanometers) thick on average, but not so thick that the amount of metal that undergoes a phase change is substantially decreased (i.e., less than about 50% by volume of the total volume of the metal and oxide shell). Typically, the oxide layer is at least about 20 nm, 50 nm, 100 nm, 500 nm, 1 micrometer or even 10 micrometers to at most about 0.5 mm, 0.2 mm, 150 micrometers, 75 micrometers or even 25 micrometers on average.

Examples of suitable glasses, include soda-lime-silicate glasses boro-silicate glasses such as PYREX, silica glasses such as VYCOR. Other glasses may include, for example, glasses described in *Electrocomponent Sci. and Tech.,* 1975, Vol. 2, pp. 163-199 by R. G. Frieser, Tables IX, XIV and XVI.

Examples of suitable salts include, NaCl, KCl, $Na_2B_4O_7$, $NaBr$, $NaBO_2$, $K_2MO_4$, KI, NaI, LiI, LiCl and mixtures thereof.

The heat absorbing material (HAM) may be in any shape or size suitable to be placed within the honeycomb of this invention. For example, the HAM may be in the form of a rod, tube, pellet, ball, sheet, particulate or any other conceivable volumetric shape.

In one embodiment, the HAM is in the form of particulates or rods that are placed in one or more channels of the filter where the channel is plugged at both ends to ensure the HAM remains within the filter.

In another embodiment the HAM is a coating that may be applied to one or more porous ceramic partition walls or portion of one or more of said walls within the porosity of said wall or walls.

In another embodiment, the HAM may comprise a portion or the entire plug for one or more channels. Such HAM plugs may be of varying lengths and may be different than the standard plugs. Where the HAM is only a portion of the plug, the plug material making up remaining portion of the plug may be any suitable material as described below.

The porous ceramic honeycomb of the filter as well as the plugs (note, the plugs may be the same or a different ceramic than the honeycomb as well as may simply be the partition walls of the honeycomb pinched together to close off a channel) may be any suitable ceramic or combinations of ceramics such as those known in the art for filtering Diesel soot. Exemplary ceramics include alumina, zirconia, silicon carbide, silicon nitride, aluminum nitride, silicon oxynitride, silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. Nos. 6,582,796 and 6,669,751B1 and WO Publications EP1142619A1, WO 2002/070106A1. Other suitable porous bodies are described by WO 2004/011386A1, WO 2004/011124A1, US 2004/0020359A1 and WO 2003/051488A1.

The ceramic is preferably a ceramic having acicular grains. Examples of such acicular ceramic porous bodies include those described by WO 2005/097706 and acicular mullite as described, for example, by U.S. Pat. Nos. 5,194,154; 5,173, 349; 5,198,007; 5,098,455; 5,340,516; 6,596,665 and 6,306, 335; U.S. Patent Application Publication 2001/0038810; and International PCT Publication WO 03/082773.

The porous ceramic honeycomb, generally, has a porosity of about 30% to 85%. Preferably, the porous ceramic honeycomb has a porosity of at least about 40%, more preferably at least about 45%, even more preferably at least about 50%, and most preferably at least about 55% to preferably at most about 80%, more preferably at most about 75%, and most preferably at most about 70%.

The honeycomb as well as the channels may be any geometric cross-sectional configuration such as round, oval, square, rectangle or any other geometric shape depending on the application. The honeycomb may be any size and is dependent upon the application.

The partition walls may contain within the walls or coated upon the surface of the wall a catalyst. Such catalyst may be any useful to catalyze the combustion of soot, carbon monoxide and/or hydrocarbons. The catalyst preferably also abates one or more other pollutant gases in a Diesel exhaust stream such as NOx (e.g., selective catalyst reduction "SCR" to nitrogen and CO oxidized to form $CO_2$).

It typically is desirable for the catalyst to be comprised of an oxide washcoat and a metal catalyst on the washcoat. A preferred washcoat is an oxide of aluminum, cerium, zirconium, aluminosilicate (e.g., zeolite) or combination thereof. More preferably the washcoat is an oxide of cerium, zirconium or combination thereof. Other exemplary washcoats that may be useful are those that are described in U.S. Pat. Appl. 2005/0113249 and U.S. Pat. Nos. 4,316,822; 5,993, 762; 5,491,120 and 6,255,249.

When using a washcoat, typical washcoats that are formed using ballmilling oxide particles may be used, but are not preferred because they tend to clog the pores of the partition walls of the honeycomb due to the average particle size typically being greater than 1 micrometer to about 20 micrometers. Examples of such washcoats are described by U.S. Pat. Nos. 3,565,830; 4,727,052 and 4,902,664. Preferably, the washcoat, when used, is precipitated from a solution as described by U.S. Pat. Appl. 2005/0113249, paragraphs 19-24, incorporated herein by reference.

The washcoat particulates, preferably, are colloidal particles dispersed within a liquid. Colloid herein means a particulate having an average particle size of less than 1 micrometer by number. The colloid may be crystalline or amorphous. Preferably, the colloid is amorphous. The colloid is preferably an alumina, ceria, zirconia or combination thereof. Such colloids are available under the trade name NYACOL, Nyacol Nano Technologies Inc., Ashland, Mass.

The colloid preferably has a small particle size where all of the particles are less than 750 nanometers (nm) in equivalent spherical diameter by number. Preferably the average particle size is less than about 500 nanometers (nm), more preferably less than about 250 nm, even more preferably less than about 100 nm, and most preferably less than about 50 nm to preferably at least about 1 nm, more preferably at least about 5 nm, and most preferably at least about 10 nm in diameter by number.

The amount of catalyst in the partition wall may be any useful amount and may vary in or on a wall along the length of a channel or channels or from channel to channel. Generally, the amount of catalyst may vary from about 10 to about 6000 grams per cu-ft and is dependent, for example, on the application and particular honeycomb used. The volume, as is convention, is taken as the geometric volume of the honeycomb, which in this case is taken as the cross-sectional area of the honeycomb by the length of the honeycomb.

Other examples of catalysts useful for combusting soot and hydrocarbons are described in col. 4, lines 25-59 of U.S. Pat. No. 4,828,807, incorporated herein by reference. Any of the catalysts described may be combined with a noble metal to improve the conversion of the gaseous pollutants traversing through the partition wall of the honeycomb filter.

The noble metal (e.g., platinum, rhodium, palladium, rhenium, ruthenium, gold, silver or alloys thereof), when used in the partition wall of the honeycomb, is preferably comprised of Pt, Pd, Rh, or combination thereof. Preferably, the noble metal is comprised of Pt and more preferably, the noble metal is Pt. The amount of noble metal may vary over a large range depending, for example, on the application. Generally, the amount of noble metal is about 1 g/cu-ft to about 500 g/cu-ft. Preferably the amount of noble metal is at least about 1, more preferably at least about 5 and most preferably at least about 10, to preferably at most about 250, more preferably at most about 125, and most preferably at most about 50 g/cu-ft.

Other exemplary catalysts include directly bound-metal catalysts, such as noble metals, alkaline metal, alkali metal base metals and combinations thereof. Examples of noble metal catalysts include platinum, rhodium, palladium, ruthenium, rhenium, gold, silver and alloys thereof. Examples of base, alkali, alkaline metal catalysts include copper, chromium, iron, cobalt, nickel, zinc, manganese, vanadium, titanium, scandium, sodium, lithium, calcium, potassium, cesium and combinations thereof. The metal catalyst, preferably, is in the form of a metal, but may be present as an inorganic compound or glass, such as a silicate, oxide, nitride and carbide, or as a defect structure within the ceramic grains of the porous partition walls of the honeycomb. The metal may be applied by any suitable technique, such as those known in the art. For example, the metal catalyst may be applied by chemical vapor deposition.

A second exemplary catalyst is one that is incorporated into the lattice structure of the ceramic grains of the porous ceramic. For example, an element may be Ce, Zr, La, Mg, Ca, a metal element described in the previous paragraph or combinations thereof. These elements may be incorporated in any suitable manner, such as those known in the art.

A third exemplary catalyst is a perovskite-type catalyst comprising a metal oxide composition, such as those described by Golden in U.S. Pat. No. 5,939,354. Other exemplary catalysts include those describe at col. 4, lines 20-59 in U.S. Pat. No. 4,828,807, incorporated herein by reference.

Other Exemplary methods for depositing one or more of the catalyst components are described in U.S. Pat. Nos. 4,515, 758; 4,740,360; 5,013,705; 5,063,192; 5,130,109; 5,254,519; 5,993,762 and; U.S. Patent Application Publications 2002/ 0044897; 2002/0197191 and 2003/0124037; International Patent Publication WO97/00119; WO 99/12642; WO 00/62923; WO 01/02083 and WO 03/011437; and Great Britain Patent No. 1,119,180.

After contacting the porous ceramic, for example, with the colloid, the porous body is typically dried by any suitable method such as letting the liquid medium dry at ambient temperatures or lightly heating (e.g., up to 400° C. or so) in any suitable gas such as dry air, nitrogen or any other gas useful to dry the solution or slurry. After, drying, typically the catalyst is further heated, for example, to adhere and/or realize the catalyst chemistry desired (e.g., decompose a carbonate to an oxide) to form the catalyst within the walls. Generally, the heating temperature is at least about 400° C. to about 1600° C. Typically, the temperature is at least about 500° C. to about 1000° C. The heating may be any suitable atmosphere such as those known in the art for any given catalyst.

Differing zones of catalyst may be created by any suitable method, such as those known in the art such as dipping only one end of the honeycomb into a slurry or solution of the catalyst to be deposited. Combinations of dipping in a differing catalyst solutions or slurries at one or both ends, or immersion of the entire honeycomb in a catalyst solution or slurry followed by dipping another catalyst solution/slurry at one or both ends or any number of combinations thereof may be used to create the catalyzed filter. Removable coatings that act as barriers to the catalyst coatings may also be employed such as waxes.

In performing the method of this invention, the filter of this invention may be placed in an exhaust system using a metal can that directs the exhaust through the filter as is conventional in the art and described. The Diesel engine is then run such that the exhaust passes through the filter, where the filter captures at least a portion of the soot emitted. Generally, the percentage by volume of soot that is captured in the filter is at least about 90% of that emitted.

Upon combustion of the soot, the filter heats up even further, and the heat absorbing material undergoes a phase change that reduces the peak temperature achieved in the filter during combustion versus a like filter without the heat absorbing material or one that merely has a greater thermal mass (heat absorption merely from heat capacitance). The peak temperature generally is decreased by at least 2%, but may be, in increasing percent, decreased by 5%, 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, but, generally, is not decreased by more than about 75%.

EXAMPLES

Example

A 10×10 cell×3" (overall dimensions ¾"×¾"×3) long acicular mullite Diesel particulate filter was made in a similar manner as in U.S. Pat. Publ. 2006-0197265, but was modified by the placement of thirteen (13) Al wires (1 mm diameter) in every other outlet channel in every other row. The pattern of Al wires is such that each inlet channel has one wall adjacent to a channel containing an Al wire. The added aluminum weighed 1.9686 g. The Al containing channels were plugged with Resbond 919 (Cotronics Corp., Brooklyn, N.Y.) ceramic cement and hence were no longer outlet channels. The DPF was then loaded with 0.146 g from the incomplete combustion of Diesel soot (~5.5 g/L).

Each of the soot loaded samples was heated in flowing $N_2$ (15 standard cubic feet per hour "scfh") to 620-630° C. When the temperature had stabilized the gas was switched from $N_2$ to air again at 15 scfh to initiate uncontrolled soot combustion. Temperatures at the outlet end and the center of the monolith were monitored. The maximum temperature and temperature profile is shown in FIG. 1.

Comparative Example

An acicular mullite filter made in the same way and of the same size as in the Example was used, except that no aluminum wires were present and those channels occupied by the aluminum wires in the Example were outlet channels. The amount of soot and the burn off of the soot was also the same as in the Example. The maximum temperature and temperature profile is shown in FIG. 2.

Figure 2:
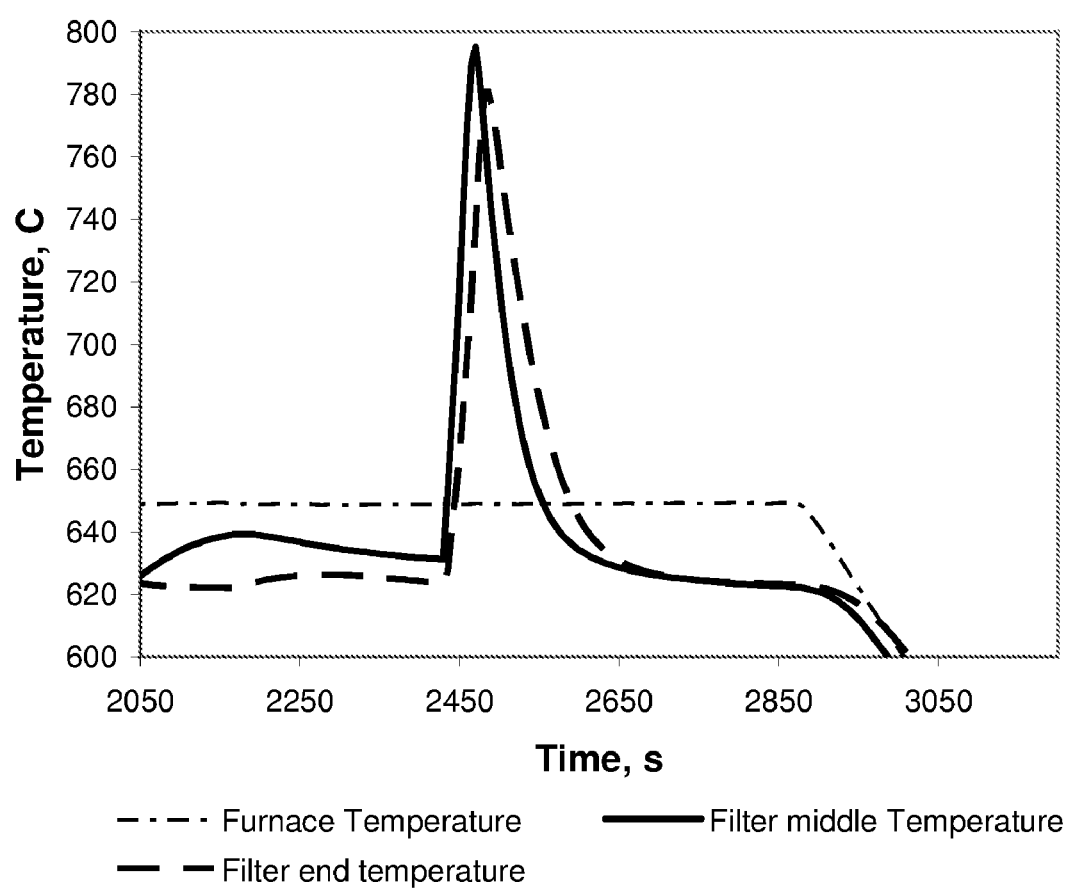
FIG. 2 is a graph of the temperature rise during burn off of soot deposited on a filter without the phase change material.

From FIGS. 1 and 2, it is clear the Example, had a significantly lower maximum temperature and the temperature profile is substantially broadened, which is desirable because it a much milder thermal event. In addition, the broadening of the temperature profile may be useful in burning further soot in a controlled way without the typical insertion of more fuel (i.e., the phase change material upon reversion will emit heat energy, which may be used to ignite further soot).

The following Claims, even though they may not explicitly depend from one another, the invention contemplates any combination of one or more embodiments of any one claim combined with any one or more claims.

What is claimed is:

1. A ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein, within the ceramic honeycomb body there is a heat absorbing material that undergoes a reversible phase change that absorbs heat energy, said absorbing material being contained within a shell that prevents flow of the heat absorbing material within the porous honeycomb ceramic body.

2. The ceramic honeycomb filter of claim 1, wherein the honeycomb is comprised of an acicular ceramic.

3. The ceramic honeycomb filter of claim 2, wherein the acicular ceramic is acicular mullite.

4. The ceramic honeycomb filter of claim 1, wherein the reversible phase change is melting from a solid to a liquid.

5. The ceramic honeycomb filter of claim 1, wherein the heat absorbing material is a metal.

6. The ceramic honeycomb filter of claim 5, wherein the metal is aluminum, tin, copper, an alloy of claim 5, or mixture of the aforementioned.

7. The ceramic honeycomb filter of claim 1, wherein the heat absorbing material is a metal encased in a shell.

8. The ceramic honeycomb filter of claim 1, wherein the shell is a ceramic or metal with a melting temperature at least 200° C. greater than the temperature where the heat absorbing material undergoes the reversible phase change.

9. The ceramic honeycomb filter of claim 8, wherein the heat absorbing material is a metal and the shell is an oxide of said metal.

10. The ceramic honeycomb filter of claim 9, wherein the metal is aluminum, copper, tin, alloy of any one of the aforementioned, or mixture of any of the aforementioned.

11. The ceramic honeycomb filter of claim 10, wherein the metal is aluminum or alloy thereof.

12. The ceramic honeycomb filter of claim 1, wherein the phase change of the heat absorbing material occurs at a phase change temperature of at least about 525° C. to at most about 1000° C.

13. The ceramic honeycomb filter of claim 12, wherein the phase change temperature is at least about 550° C.

14. The ceramic honeycomb filter of claim 13, wherein the phase change temperature is at most about 800° C.

15. A method of filtering diesel soot comprising,
i) providing a ceramic honeycomb filter having, within the ceramic honeycomb filter, a heat absorbing material that undergoes a reversible phase change that absorbs heat energy, ii) passing, diesel exhaust through the said ceramic honeycomb filter such that soot in said exhaust is captured by said filter, and iii) heating the ceramic honeycomb filter sufficiently such that the Diesel soot combusts wherein the heat absorbing material changes phase such that a portion of the heat generated from combustion of said soot is absorbed by said change of phase.

16. The method of claim 15, wherein the heat absorbing material is a metal.

17. The method of claim 16, wherein the heat absorbing material is a metal encased in shell having a melting temperature at least 200° C. higher than the temperature where the heat absorbing material undergoes the reversible phase change.

18. The method of claim 16, wherein the metal is aluminum or alloy thereof.

19. The method of either claim 15, wherein the heat absorbing material is encased in a shell.

20. The method of claim 19, wherein the shell is a ceramic or metal with a melting temperature at least 200° C. greater than the temperature where the heat absorbing material undergoes the reversible phase change.

* * * * *